Aug. 23, 1966  T. DEIGHTON  3,267,906
COMPACT HEAT SOURCE AND HEAT EXCHANGER
Filed June 30, 1964  3 Sheets-Sheet 1

INVENTOR
THOMAS DEIGHTON
BY
[signature]
ATTORNEY

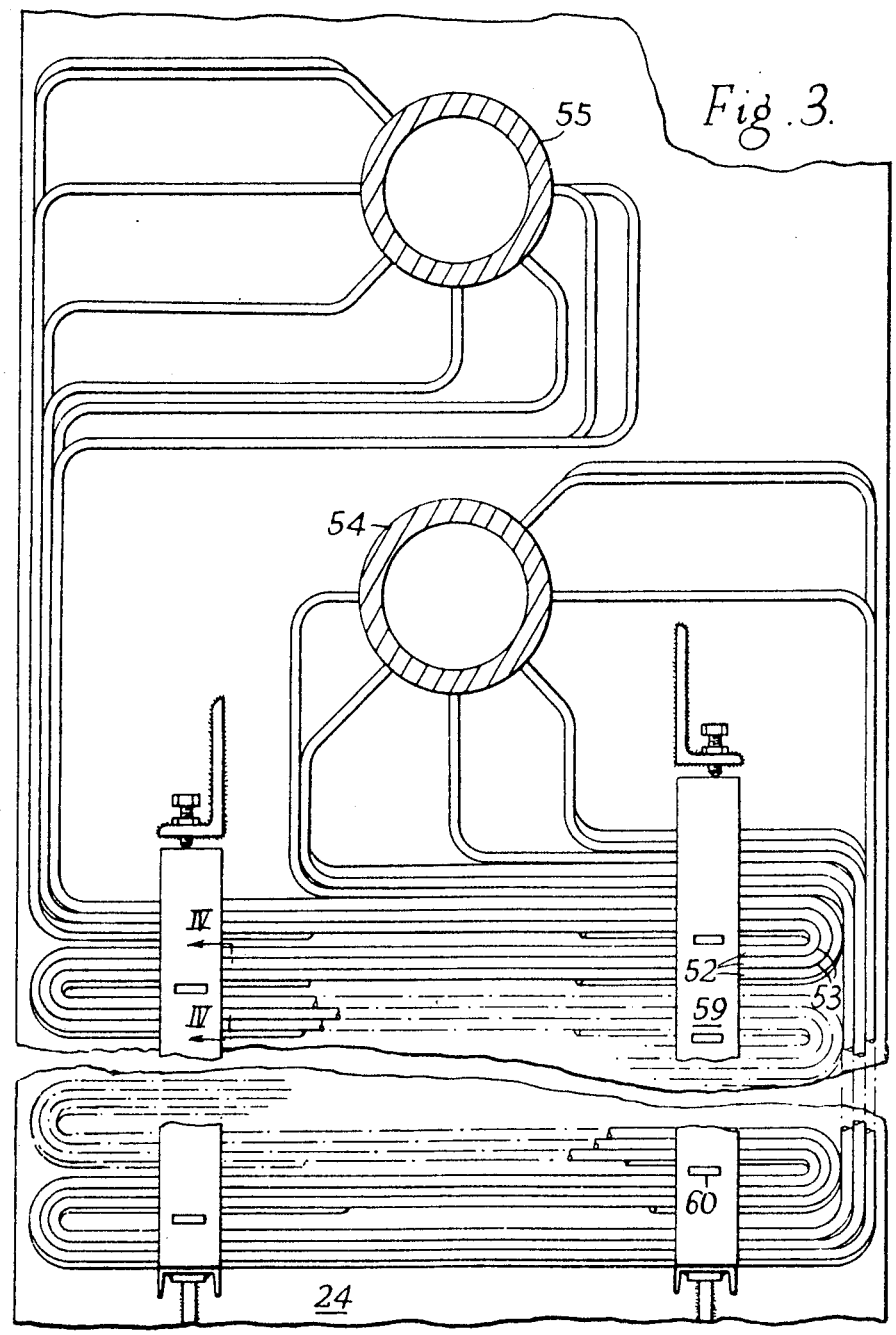

United States Patent Office

3,267,906
Patented August 23, 1966

1

3,267,906
COMPACT HEAT SOURCE AND HEAT
EXCHANGER
Thomas Deighton, London, England, assignor to Babcock & Wilcox Limited, London, England, a corporation of Great Britain
Filed June 30, 1964, Ser. No. 379,284
Claims priority, application Great Britain, July 3, 1963, 26,360/63
6 Claims. (Cl. 122—32)

This invention relates to nuclear reactors and, particularly, to integral nuclear reactors of the kind having a heat exchanger disposed within an annular space between a reactor core and a pressure vessel, an object of the invention being the provision of an improved heat exchanger arrangement.

Accordingly, this invention provides an integral nuclear reactor having a heat exchanger disposed within an annular space between a reactor core and a pressure vessel. The heat exchanger is a forced flow vapor generator comprising a plurality of tube banks occupying different parts of the annular space. Each bank comprises parallel connected sinuous tubes, the tube limbs of which extend substantially horizontally along the annular space and are connected for the upward flow of working fluid.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there has been illustrated and described preferred embodiments of the invention.

Of the drawings:

FIG. 3 is a developed elevation taken on the line III—III of FIG. 2; and

Figure 1:
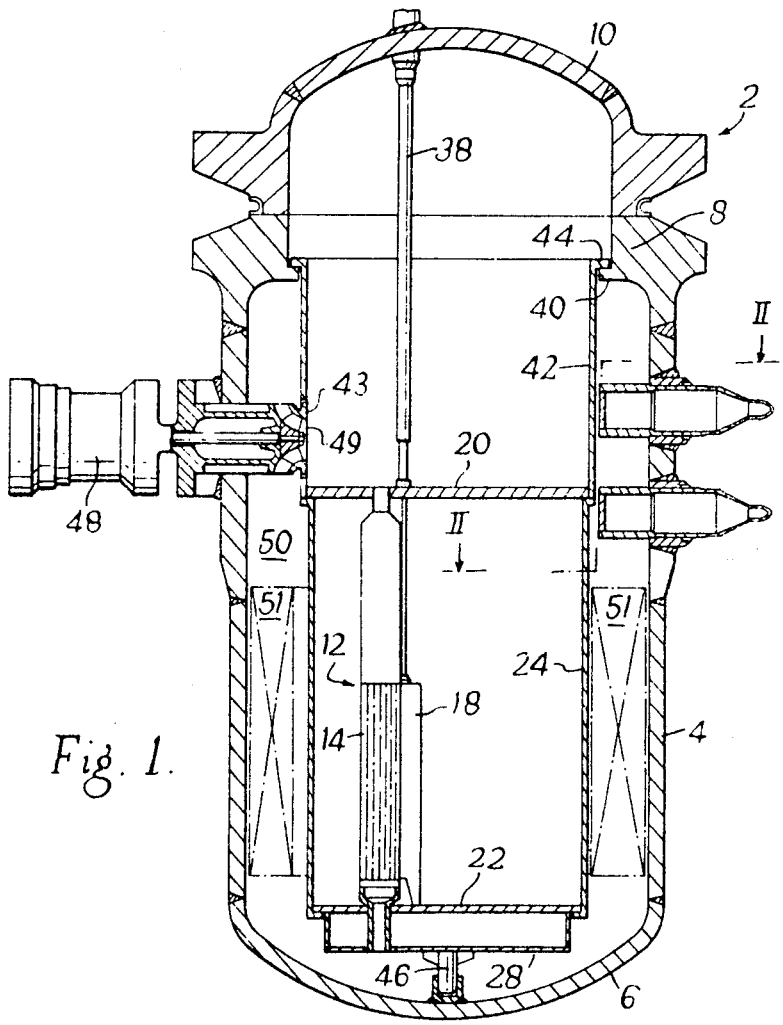
FIG. 1 is a cross-sectional elevation of a liquid-cooled and liquid-moderated nuclear reactor, parts of a fuel element also being shown in section and other fuel elements being omitted together with insulation and shielding of the reactor.
Figure 2:
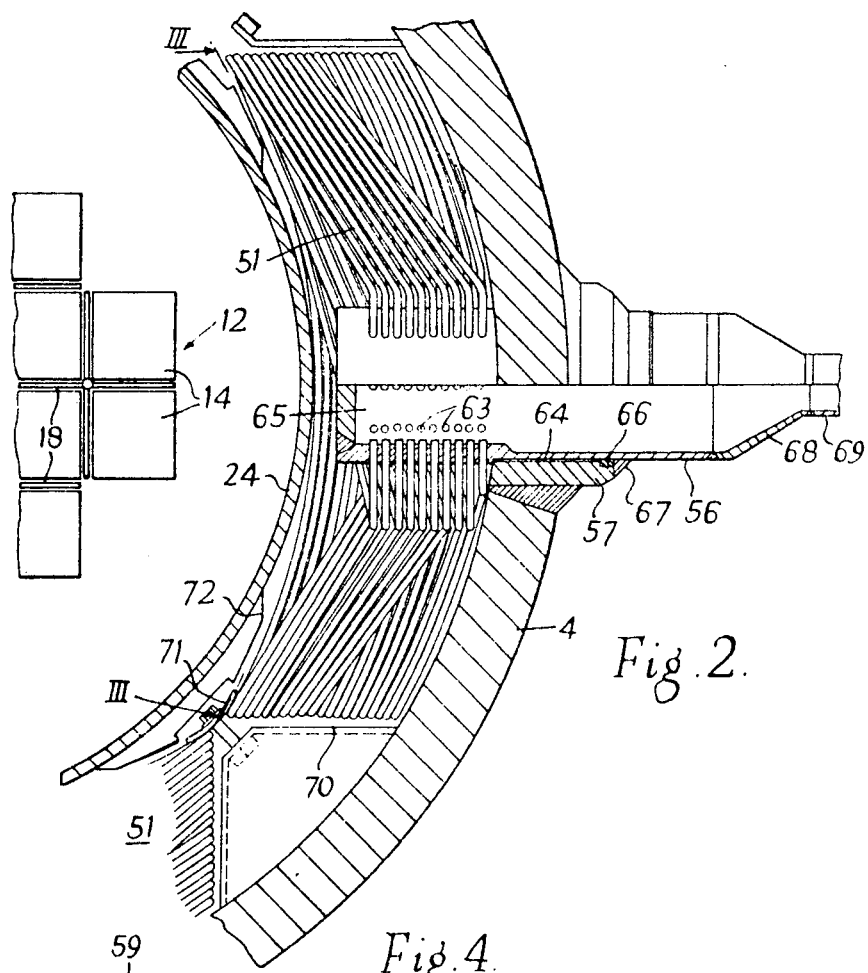
FIG. 2 is a cross-sectional view taken on the line II—II of FIG. 1, to an enlarged scale.

Referring to the drawings, FIG. 1 shows a pressurized water reactor 2 having a pressure vessel 4 of upright cylindrical form with a domed end 6 at its base and a flange 8 at its upper end. A domed lid 10 is bolted and seal welded to the flange 8.

Located in the lower portion of the reactor vessel 4 is a core 12 comprising twenty-four fuel elements 14 of square cross section and nine cruciform shaped control rods 18 interposed between the fuel elements 14.

The fuel elements 14 extend between upper and lower support grids 20, 22 mounted on a containing vessel 24 which also serves as a thermal neutron shield.

Drive means 38 for the control rods 18 extend downwardly through lid 10 and upper support grid 20 and are arranged to move the control rods 18 between the active lengths of the fuel elements 14 in the lower half of the containing vessel 24 and the upper half of the containing vessel.

The containing vessel 24 is supported from an inwardly extending shoulder 40 on the flange 8 by means of an upper extension 42 welded to the main part of the containing vessel, formed with apertures 43 and having an outwardly extending flange 44 resting on and bolted to the shoulder 40. The base 28 of the containing vessel

2

24 is located by a lug 46 which fits into a socket 47 welded to the base 6 of the pressure vessel 4.

Four centrifugal pumps 48 are equiangularly spaced around and bolted to the pressure vessel 4 with the inlets 49 thereto connected to the apertures 43 in the upper extension 42 of the containing vessel 24 and discharging to annular space 50 between the pressure vessel 4 and the containing vessel 24.

Four banks 51 of parallel connected, nested, sinuous tubes 52 having horizontally extending, curved tube limbs of substantially the same radius of curvature as the adjacent wall of the pressure vessel 4 are positioned in the space 50.

Figure 4:
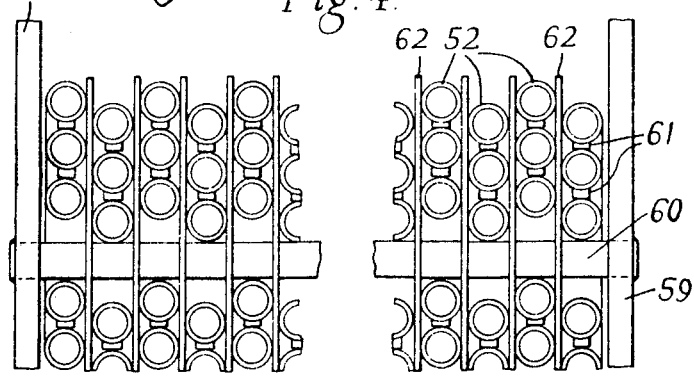
FIG. 4 is a cross-sectional elevation taken on the line IV—IV of FIG. 3.

The sinuous tubes 52 are all of substantially the same length and, as shown in FIGS. 3 and 4, the tube limbs of a bank in adjacent horizontal rows are staggered, the external tube diameter and the pitch of the tubes being such that return bends 53 of adjacent vertical rows of tube limbs engage one another to assist in positioning the tubes.

The sinuous tubes 52 of each bank 51 are formed with ends connected to a feed inlet header 54 and a vapor outlet header 55 disposed vertically above the inlet header and symmetrically of and having extensions 56 passing through nozzles 57 in the wall of the pressure vessel 4. The tube ends 58 connected to the feed inlet header 54 pass downwardly at one edge of the tube bank.

The tube inlets are provided with ferrules (not shown) for ensuring proper distribution of the working fluid between the tubes. Alternatively, a short length of a smaller bore pipe, of say, .2" bore, may be used for the tube ends 58 passing from the feed header 54 to the bottom of the tube bank 51. In order to improve stability of flow, lengths of tubes of each bank 51 at the bottom thereof are of reduced internal diameter, for example, the internal diameter may be reduced, say, from 0.69 to 0.4 inch over the bottom two or three limbs.

The tubes 52 of each bank are supported and positioned near each edge thereof on a frame 59 formed of channel iron and suitably supported from the wall of the pressure vessel 4 and welded to and passing between the upright sides of each frame are bars 60 which pass through the respective spaces between the innermost limbs of the nested tubes 52 and serve to support the uppermost limb of the said innermost limbs in alternate sets of nested tubes. In each nest of tubes, upper limbs are supported on lower limbs by lugs 61 provided on the tubes. Vertical tube locating rods 62 are positioned between adjacent sets of nested tubes.

The tubes 52 of each tube bank 51 are connected to the associated feed inlet header 54 and vapor outlet header 55 at circumferentially distributed axially extending rows of tube holes 63.

At each header 54, 55, there is a small annular gap 64 between the extension 56 and the inner surface of the nozzle 57 but inwardly of the nozzle the associated header has an external diameter greater than the internal diameter of the nozzle. In the region of the tube holes 63 the internal diameter is decreased to afford adequate ligament strength, and the radially inner end of each header is closed by a circular plate 65 welded in position. The nozzles 57, which serve to reinforce the pressure vessel 4 at the associated openings and also act as thermal sleeves are each internally recessed at an outer end 65 to accommodate a backing ring 66 for a weld 67 uniting the extension 56 to the nozzle 57. The extension 56 projects beyond the weld 67 and at its end is welded to a transition piece 68 having a part of frusto conical form terminating in a pipe 69 of smaller diameter than the extension 56. By removing the transition piece 68 from the extension 56 of a header 54, 55, access may be had to the interior of the header in order to plug the end of a defective tube.

Fluid flowing over the outside of the tubes is constrained to pass entirely over the parallel parts of the tube banks thus getting the highest rate of heat transfer over this section and preventing fluid by-passing it. The approximately triangular section spaces between adjacent tube banks are closed to fluid flow by baffle plates 70 welded to the wall of the pressure vessel and provided at their inward extremities with clamps 71 which assist in locating the tube banks 51. The wall of the containing vessel 24 is also provided with baffle plates 72 for limiting flow of fluid in gaps between that wall and the tube banks 51.

The dimensions of the tube banks 51 are similar to one another, and they may be withdrawn through the opening in the top of the pressure vessel 4 after the domed lid 10 and the containing vessel 24 together with the fuel elements 14 and control rods 18 have been removed.

In order to remove a tube bank 51 from the pressure vessel having removed the domed lid 10 and the containing vessel 24 together with the fuel elements 14 and control rods 18, it is necessary to cut the welded joints between the pipes 69 connected to the feed inlet headers 54 and the vapor outlet headers 55 and between the said headers 54, 55 and the associated nozzles 57. The tube bank, after release from the clamps 71 associated with the baffles 70, then may be moved radially inwards to withdraw the header extensions 56 from the nozzles 57 and lifted through the opening in the pressure vessel 4. Such removal and replacement of the tube bank may be carried out remotely, the manipulations being effected under water contained in the reactor's overall containment vessel which is flooded for the purpose.

During operation of the integral reactor, the primary moderator and coolant, which may be light or heavy water or a mixture thereof, is circulated by the pumps 48 down through annular space 50 and up through the core 12. As it passes down within the annular space 50 between the wall of the containing vessel 24 and the cylindrical wall of the pressure vessel 4, the coolant flows transversely across the tube limbs of the tube banks 51.

The secondary fluid, generally water, is supplied by a feed pump (not shown) to the feed inlet header 54 of each tube bank 51 and passes through the associated tube ends 58 to the bottom of the tube bank and then flows in a generally upward direction and in counter-flow to the primary fluid. Heat transferred to it vaporizes the cooler secondary fluid before it is finally discharged at the vapor outlet header 55 from which it passes to a turbine or other vapor using means.

In an alternative arrangement (not shown) there is associated with each tube bank a single header passing in a similar manner through a nozzle and divided internally into vapor outlet and feed inlet spaces. The feed inlet space is provided at the header wall with a thermal shield, and an inlet pipe leading to the feed inlet space extends within and concentrically in relation to the pipe leading from the vapor space.

It will be appreciated that while an arrangement embodying the use of four similar tube banks within the pressure vessel 4 has been described, in a higher pressure plant in which it may be desirable to reduce the diameter of the pressure vessel opening, it would be necessary to use five or more similar tube banks and conversely for a larger opening, it may be desirable to use three similar tube banks. It will also be appreciated that since the tube banks are similar to one another and the sinuous tubes in each bank are also similar, the formation, assembly and replacement of the tubes is greatly simplified.

Further, it will be realized that the compactness and lightness of the integral reactor and the accessibility of the tube holes 63 for plugging the exterior of the reactor pressure vessel in this arrangement are particularly advantageous for marine reactors.

While in accordance with the provisions of the statutes there is illustrated and described herein the best forms and modes of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A heat exchanger comprising a vertically elongated pressure vessel, a containing vessel disposed within and spaced from said pressure vessel forming an annular space therebetween, a heat source located within said containing vessel for heating a first fluid, a plurality of tube banks disposed within said annular space for flow through the tubes of said tube banks of a second fluid in indirect heat transfer relationship with said first fluid which flows upwardly through said containing vessel and downwardly through said annular space over said tube banks, each of said tube banks comprising a multiplicity of parallel sinuous tubes of similar shape and length and each formed by a number of horizontally arranged tube limbs interconnected by return bends, each of said tube limbs being arcuate in form and having substantially the same radius of curvature as the adjacent wall of said pressure vessel, said sinuous tubes in each tube bank arranged in a number of vertically extending horizontally spaced platens with the tube limbs in a single platen spaced apart and the tube limbs in adjacent platens disposed in staggered relationship, the return bends interconnecting said adjacent tube limbs in the same platen arranged in contacting engagement, and an inlet header and an outlet header for each of said tube banks disposed in said annular space superjacent said banks.

2. A heat exchanger as set forth in claim 1 wherein the tube limbs are curved to provide a concave boundary adjacent the containing vessel and a convex boundary adjacent the pressure vessel.

3. A heat exchanger as set forth in claim 2 wherein there are four similarly configured tube banks equiangularly distributed about the annular space.

4. A heat exchanger as set forth in claim 3 wherein baffles are arranged in said annular space between adjacent tube banks to direct the flow of the first fluid over the tubes.

5. A heat exchanger as set forth in claim 1 wherein nozzles are connected to the wall of said pressure vessel opposite said inlet and outlet headers, and said headers extend through said nozzles exteriorly of said pressure vessel.

6. A heat exchanger as set forth in claim 1 wherein a closure is provided for an opening in the upper end of said pressure vessel, said opening being sufficiently large to permit the tube bank to be removed from the vessel as a unit.

References Cited by the Examiner

UNITED STATES PATENTS

| | | |
|---|---|---|
| 3,012,547 | 12/1961 | Ostergaard et al. |
| 3,126,949 | 3/1964 | Boni et al. _____ 122—32 X |
| 3,150,051 | 9/1964 | Ammon _____ 176—65 |
| 3,151,034 | 9/1964 | Douglass et al. _____ 176—65 |
| 3,153,444 | 10/1964 | Purdy et al. _____ 122—32 X |
| 3,163,585 | 12/1964 | Metcalfe et al. _____ 176—65 |

BENJAMIN R. PADGETT, *Acting Primary Examiner.*

L. DEWAYNE RUTLEDGE, *Examiner.*